US008643733B2

(12) United States Patent
Miyasako (10) Patent No.: US 8,643,733 B2
(45) Date of Patent: Feb. 4, 2014

(54) IMAGING APPARATUS AND METHOD FOR CONTROLLING SAME

(75) Inventor: Kenichi Miyasako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 13/420,024

(22) Filed: Mar. 14, 2012

(65) Prior Publication Data

US 2012/0249813 A1    Oct. 4, 2012

(30) Foreign Application Priority Data

Apr. 4, 2011   (JP) ................................. 2011-083032

(51) Int. Cl.
*H04N 5/228* (2006.01)
(52) U.S. Cl.
USPC .................. 348/208.7; 348/208.11
(58) Field of Classification Search
USPC ........ 348/208.4, 208.5, 208.7, 208.11, 240.3; 396/55
See application file for complete search history.

(56) References Cited

U.S. PATENT DOCUMENTS

| 5,771,406 | A * | 6/1998 | Sakamoto et al. | 396/55 |
|---|---|---|---|---|
| 7,450,155 | B2 * | 11/2008 | Nakanishi et al. | 348/208.5 |
| 7,672,578 | B2 * | 3/2010 | Shibata | 396/55 |
| 7,821,540 | B2 * | 10/2010 | Kurata | 348/208.6 |
| 7,956,896 | B2 * | 6/2011 | Hoshi | 348/208.11 |
| 2012/0105656 | A1 * | 5/2012 | Noguchi | 348/208.4 |

FOREIGN PATENT DOCUMENTS

| JP | 06-067255 A | 3/1994 |
|---|---|---|
| JP | 2002-049069 A | 2/2002 |
| JP | 2006-154863 A | 6/2006 |
| JP | 4399668 | 11/2009 |
| JP | 2010-171941 A | 8/2010 |

OTHER PUBLICATIONS

Apr. 16, 2013 Japanese Office Action, which is enclosed without English Translation, that issued in Japanese Patent Application No. 2011-083032.

* cited by examiner

*Primary Examiner* — Tuan Ho
*Assistant Examiner* — Shahbaz Nazrul
(74) *Attorney, Agent, or Firm* — Cowan, Liebowitz & Latman, P.C.

(57) ABSTRACT

A direction instructing operation unit instructs a control unit to change a direction of a change in the photographic screen range. First motor drives a compensation optical system and second motor drives a compensation optical system in accordance with the control command given by the control unit. When the direction along which framing adjustment has been instructed by the direction instructing operation unit matches neither the drive direction of the first motor nor the drive direction of the second motor for driving the compensation optical system, the control unit matches a drive start time and a drive end time of both the first motor and the second motor, and then controls the ratio of the speed of the second drive unit to the speed of the first drive unit at a constant level to thereby control the moving direction of the photographic screen range.

6 Claims, 8 Drawing Sheets

DIRECTION ALONG
WHICH MOTOR IS DRIVEN

FIG. 3B

DIRECTION ALONG
WHICH MOTOR IS DRIVEN

IMAGING APPARATUS AND METHOD FOR CONTROLLING SAME

BACKGROUND OF THE INVENTION

1. Field of the Invention

The present invention relates to an imaging apparatus having the function of optically compensating image blur caused by camera shake or the like, and a method for controlling the same.

2. Description of the Related Art

In recent years, with focusing on camera shake holding an imaging apparatus as the cause for lowering the quality of a captured image, an imaging apparatus mounted with the image blur compensating function of compensating the blur of a captured image due to camera shake or the like is widely available. Various ideas for utilizing the image blur compensating function not only for the compensation of the blur of a captured image but also for other applications have been proposed.

Japanese Patent No. 4399668 discloses an imaging apparatus having the function of performing the fine adjustment of framing by utilizing an image blur compensating mechanism upon shooting with a tripod. The apparatus performs the fine adjustment of framing by controlling an image blur compensating member in the up-and-down and right-and-left directions depending on the operation of a cross key and moving an imaging region. In addition, the image blur compensating member drives a blur compensating optical system using two motors in a plane perpendicular to the optical axis of the imaging apparatus and the direction along which the cross key is operated matches the direction along which the motor is driven. Thus, framing adjustment may be made by driving one of two motors, which corresponds to the operating direction of the cross key, depending on the operating direction of the cross key by a user.

With the recent increase in touch panels, an interface for operating an imaging apparatus by touching an operation screen instead of a cross key by a user has become common. Use of a touch panel allows a user to instruct the apparatus to perform framing adjustment in any direction through 360 degrees without limiting framing adjustment only in four directions of up-and-down and right-and-left in case of using a cross key. In this case, since the direction along which framing adjustment has been instructed does not necessarily match the direction along which each of two motors used in the image blur compensating mechanism is driven, the disadvantages may occur when two motors are controlled independently. For example, in the case where the driving amounts of two motors are different, the direction of moving of the photographic screen range during framing adjustment may change midway when the driving of one motor terminates earlier than the driving of the other motor. Consequently, screen moving may become unnatural.

SUMMARY OF THE INVENTION

Accordingly, the present invention provides an imaging apparatus that performs framing adjustment using a compensation mechanism for compensating image blur. Even when the direction instructed for moving a photographic screen range does not correspond to the direction along which the drive unit for the compensation member is driven, the imaging apparatus moves the photographic screen range along the instructed direction.

According to an aspect of the present invention, an imaging apparatus that is capable of changing a photographic screen range using a compensation member which compensates image blur caused by camera shake is provided that includes a direction instructing operation unit configured to instruct a direction of a change in the photographic screen range; a first drive unit configured to drive the compensation member in a first direction not parallel to the optical axis of a photographing optical system; a second drive unit configured to drive the compensation member in a second direction not parallel to the optical axis and orthogonal to the direction of the first direction; and a control unit configured to control the first drive unit and the second drive unit in accordance with an operation instruction given by the direction instructing operation unit. When the direction instructed by the direction instructing operation unit does not match any of the first direction and the second direction, the control unit matches a drive start time and a drive end time of both the first drive unit and the second drive unit, and controls the ratio of the speed of the second drive unit to the speed of the first drive unit at a constant level.

According to the present invention, even when the direction instructed for moving a photographic screen range does not correspond to the direction along which the first and the second drive units are driven, the imaging apparatus is capable of moving the photographic screen range along the instructed direction.

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the drawings. An imaging apparatus to be described below is capable of changing its photographic screen range using a compensation member which is movable in a direction orthogonal to the optical axis of an imaging optical system.

Figure 1:
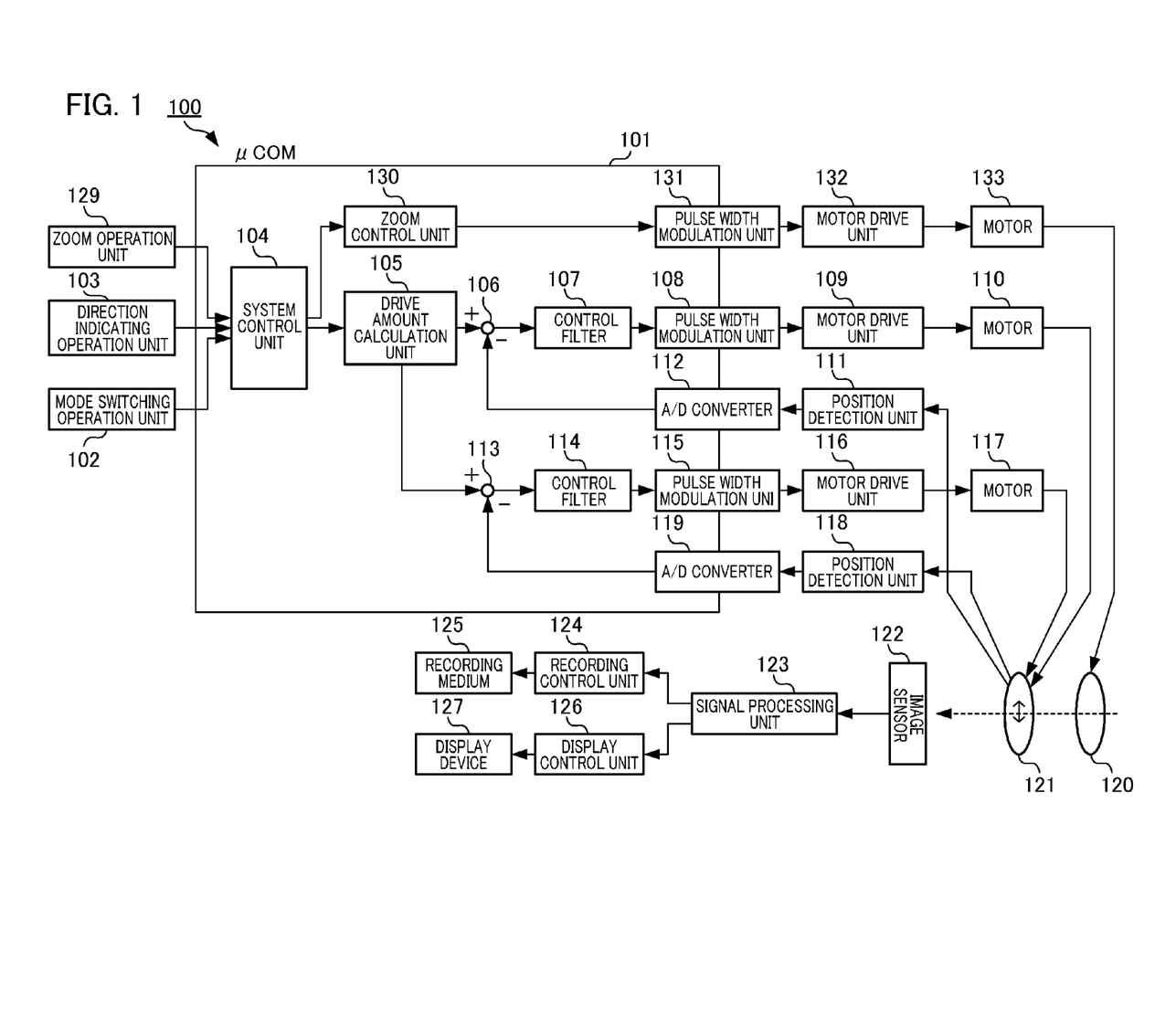
FIG. 1 is a block diagram illustrating an exemplary configuration of the imaging apparatus of the present invention.

FIG. 1 is a block diagram illustrating an exemplary configuration of the imaging apparatus common to the embodiments of the present invention.

The incident light reflected from the object is focused on the imaging plane of an imaging apparatus 100 through an imaging optical system 120. The compensation optical system 121 serving as the compensation member is, for example, a shift lens that is moved within a plane perpendicular to the optical axis of the imaging optical system 120 to change the angle of the optical axis with respect to the imaging plane. The movement of the compensation optical system 121 is capable of optically compensating image blur generated in the captured image of the imaging apparatus 100 and changing the imaging direction of the imaging apparatus 100. In other words, framing adjustment can be made utilizing a compensation member (a shift lens or an image sensor) which is movable in a direction orthogonal to the optical axis.

An image sensor 122 photoelectrically converts an optical image, which has been formed on the imaging plane through the imaging optical system 120 and the compensation optical system 121 to thereby output an imaging signal. A signal processing unit 123 performs signal processing of an imaging signal output by the image sensor 122, and converts the imaging signal into a video signal in accordance with the NTSC format or the like. Also, the signal processing unit 123 outputs a video signal to a display control unit 126 to thereby cause a display device 127 to display an image. Furthermore, when recording a video signal has been instructed by an operation unit (not shown) used for the instruction of the start and end of recording, the signal processing unit 123 outputs a video signal to a recording control unit 124 to thereby cause a recording medium 125 to record the video signal. The recording medium 125 is a magnetic recording medium such as a hard disk or an information recording medium such as a semiconductor memory. The display control unit 126 drives the display device 127, and the display device 127 displays characters and images using a liquid crystal display element (LCD) or the like. The display control unit 126 causes the display device 127 to display menu information for the various settings in addition to images to be recorded.

A mode switching operation unit 102 includes an operation member that controls compensation of image blur by driving the compensation optical system 121 or performs framing adjustment in accordance with an operation instruction given by a user. Hereinafter, the state of controlling compensation of image blur by the compensation optical system 121 is referred to as an "image blur compensation mode" and the state of performing framing adjustment by the compensation optical system 121 is referred to as a "framing adjustment mode".

The direction instructing operation unit 103 instructs a direction of a change in the photographic screen range. The direction instructing operation unit 103 includes an operation member that is used by a user to instruct the framing adjustment direction. The operation member can instruct the framing adjustment direction when the framing adjustment mode is set, by means of the operation of the mode switching operation unit 102 by the user. Examples of such operation member include an a cross key, a touch panel, a remote controller, and the like. Any operation-type member may be used as long as a user can instruct the framing adjustment direction. Also, a zoom operation unit 129 includes an operation member that is used by a user to instruct a changed in the zoom magnification of the imaging optical system 120.

Operation information from the mode switching operation unit 102, the direction instructing operation unit 103, and the zoom operation unit 129 is transmitted to a system control unit 104 provided in a control unit 101 (see μCOM shown in FIG. 1). FIG. 1 shows a functional block illustrating processing to be realized by a CPU (Central Processing Unit) in the control unit 101 by interpreting and executing a control program. The system control unit 104 controls the driving amount calculation unit 105 depending on operation information from each operation unit. The driving amount calculation unit 105 determines the position of the compensation optical system 121 depending on information from the system control unit 104, and outputs the position to both subtractors 106 and 113. The compensation optical system 121 is driven by two motors: the first motor 110 and the second motor 117. The motors cause the compensation optical system 121 to move in different directions in a plane perpendicular to the optical axis of the imaging optical system 120. With this arrangement, the photographic screen range moves in the lengthwise and widthwise directions of the screen as viewed from a user. Hereinafter, a direction along which a first motor (first drive unit) 110 is driven with respect to the operation for moving the compensation optical system 121 in a first direction in the plane is referred to as a "first drive direction". Also, a direction along which a second motor (second drive unit) 117 is driven with respect to the operation for moving the compensation optical system 121 in a second direction orthogonal to the first direction in the plane is referred to as a "second drive direction".

The circuit from the subtractor 106 through a control filter 107 and a pulse width modulation unit 108 to a motor drive unit 109 controls the first motor 110. The circuit from a position detection unit 111 through an A/D converter 112 to back to the subtractor 106 performs position detection in the first direction of the compensation optical system 121. Each of these circuits forms a feedback loop to drive/control the first motor 110 in the first drive direction. The position detection unit 111 detects the position of the compensation optical system 121 in the first drive direction. The A/D converter 112 converts a position detection signal received from the position detection unit 111 into a digital signal and transmits the digital signal to the subtractor 106. The subtractor 106 subtracts the position detection signal from the output signal of the driving amount calculation unit 105 and outputs the resulting signal to the control filter 107. The signal passed through the control filter 107 is transmitted to the pulse width modulation unit 108, and is converted into a PWM (Pulse Width Modulation) signal. The motor drive unit 109 drives the first motor 110 in the first drive direction based on the PWM signal from the pulse width modulation unit 108 to thereby cause the compensation optical system 121 to move in the first direction.

On the other hand, the circuit from the subtractor 113 through a control filter 114 and a pulse width modulation unit 115 to a motor drive unit 116 drives the second motor 117. The circuit from a position detection unit 118 through an A/D converter 119 to back to the subtractor 113 performs position detection in the second direction of the compensation optical system 121. Each of these circuits forms a feedback loop to drive/control the second motor 117 in the second drive direction. The motor 117 is driven in the same manner as the first motor 110, and thus, no description will be given here.

The operation of the driving amount calculation unit 105 is determined by the operation of the mode switching operation unit 102 and is changed as follows depending on the operation mode of the imaging apparatus 100.

Firstly, when the imaging apparatus 100 is set to the image blur compensation mode, the driving amount calculation unit 105 acquires the output of a sensor such as an angular velocity sensor (not shown) or the like, which detects camera shake and the shake of the imaging apparatus 100. The driving amount calculation unit 105 calculates the amount of movement (the amount of position control) of the compensation optical system 121, and outputs the calculated result to the subtractors 106 and 113. This ensures the control of compensation of image blur.

When the imaging apparatus 100 is set to the framing adjustment mode, the driving amount calculation unit 105 calculates the amount of movement of the compensation optical system 121 based on operation information from the direction instructing operation unit 103, and outputs the calculated result to the subtractors 106 and 113. The details of the operation of the driving amount calculation unit 105 in the framing adjustment mode will be described below.

Operation information from the zoom operation unit 129 which is used for changing zoom magnification is transmitted to a zoom control unit 130 via the system control unit 104. The zoom control unit 130 determines the zoom speed and the target zoom position depending on operation information from the zoom operation unit 129 to thereby control a pulse width modulation unit 131. A motor drive unit 132 drives the motor 133 based on the PWM signal from the pulse width modulation unit 131, and controls the position of a variable power optical system (not shown) provided in the imaging optical system 120.

(First Embodiment)

Hereinafter, a detailed description will be given of processing to be executed by the driving amount calculation unit 105 according to the first embodiment of the present invention.

Figure 2A:
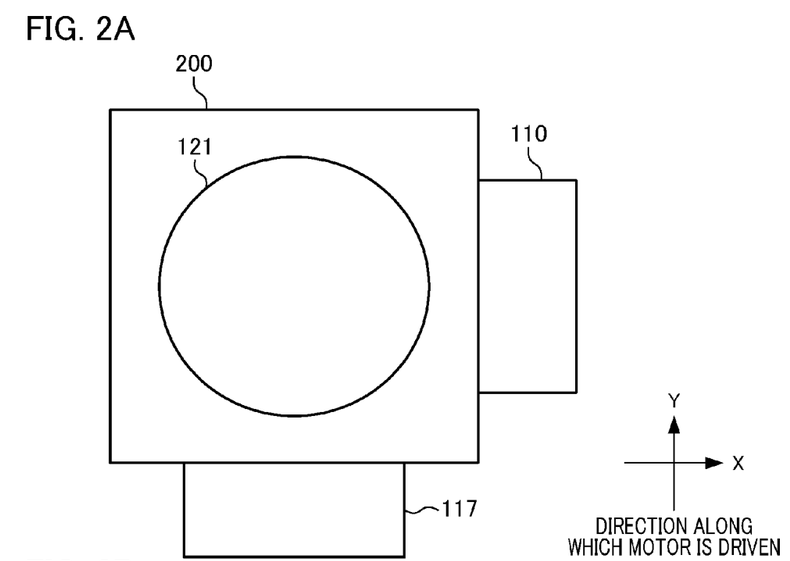
FIG. 2A is a diagram illustrating an exemplary arrangement of a compensation optical system 121 and first motor 110 and second motor 117.

FIG. 2A shows a compensation optical system 121 and the first motor 110 and the second motor 117. The compensation optical system 121 indicated by a circular shape is held by a frame 200 indicated by a square shape on the outside thereof. The first motor 110 and the second motor 117 are attached at the lateral surfaces of the frame 200. The axis X and the axis Y represent the directions along which the motor is driven and are orthogonal to each other. The motor 110 drives the compensation optical system 121 in the X-axis direction and the second motor 117 drives the compensation optical system 121 in the Y-axis direction. Note that the X-Y plane shown in FIG. 2A is a plane perpendicular to the optical axis of the imaging optical system 120, and the position of the compensation optical system 121 is represented by the two-dimensional coordinate (X, Y) in the following description.

Figure 3A:
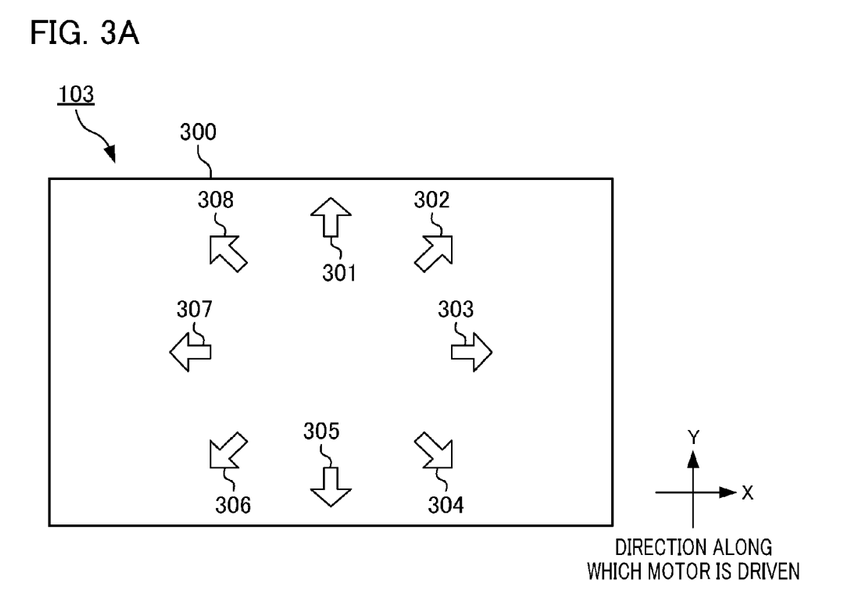
FIG. 3A is a diagram illustrating an example of a direction instructing operation unit 103.

FIG. 3A shows an example of the direction instructing operation unit 103 constituted by a touch panel. The outer frame of the rectangular represents the outer shape of a touch panel 300. Arrows 301 to 308 are displayed on the touch panel 300. When a user's finger touches the arrow of the direction to which a user wishes to perform framing adjustment, the driving amount calculation unit 105 controls the position of the compensation optical system 121 such that the photographic screen range moves in the direction of the arrow corresponding to the contact position. The arrows 303 and 307 are opposite to each other in a direction parallel to the axis X and the arrows 301 and 305 are opposite to each other in a direction parallel to the axis Y. The arrows 302 and 306 are opposite to each other in a direction diagonally upward to the right as shown in FIG. 3A at an angle of 45 degrees with respect to the axis X and the axis Y. The arrows 304 and 308 are opposite to each other in a direction diagonally upward to the left as shown in FIG. 3A at an angle of 45 degrees with respect to the axis X and the axis Y. For example, the compensation optical system 121 is driven in the X-axis direction shown in FIG. 2A during the execution of framing adjustment in the direction indicated by the arrow 303 or the arrow 307 and the compensation optical system 121 is driven in the Y-axis direction shown in FIG. 2A during the execution of framing adjustment in the direction indicated by the arrow 301 or the arrow 305. While, in the present embodiment, a user interface which enables framing adjustment in eight directions indicated by the arrows 301 to 308 is shown, the present invention is not limited thereto. For example, another user interface which enables framing adjustment in any direction through 360 degrees may also be employed.

Figure 4:
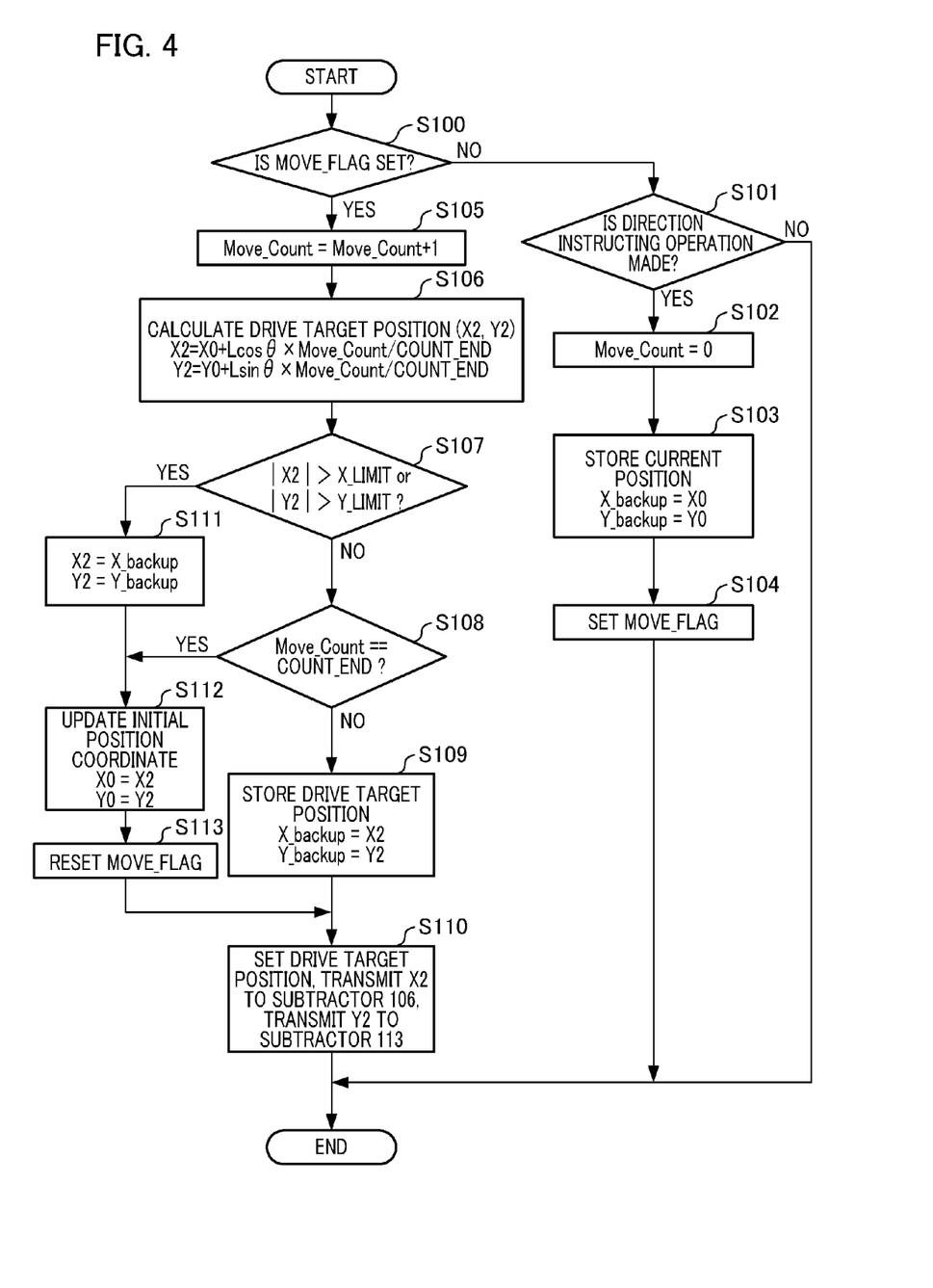
FIG. 4 is a flowchart illustrating processing performed by a driving amount calculation unit 105 in order to explain a first embodiment of the present invention in conjunction with FIGS. 5A, 5B, and 6.

Next, a description will be given of the flow of processing performed by the driving amount calculation unit 105 upon the setting of the framing adjustment mode with reference to the flowchart shown in FIG. 4. The process shown in FIG. 4 is repeatedly executed at a predetermined time interval.

In step S100, it is determined whether or not the flag (designated as "MOVE_FLAG") indicating that the compensation optical system 121 is being driven for framing adjustment is set. When it is determined that MOVE_FLAG is not set, the process advances to step S101. In step S101, the system control unit 104 determines the user operation for the direction instructing operation unit 103. The user operation for the direction instructing operation unit 103 is the operation performed by a user by selecting and touching any one of the arrows 301 to 308 displayed on the touch panel 300 shown in, for example, FIG. 3A. When it has been determined in step S101 that the user operation for the direction instructing operation unit 103 is not performed, the process is ended. When it has been determined in step S101 that the user operation for the direction instructing operation unit 103 is performed, the process advances to step S102.

In step S102, the variable (designated as "Move_Count") of a counter used for controlling the compensation optical system 121 is cleared to zero. In step S103, the current position coordinate (X0, Y0) of the compensation optical system 121 is stored in the variable (X_backup, Y_backup). The variable (X_backup, Y_backup) is a variable for temporarily storing a position coordinate value.

Figure 5A:
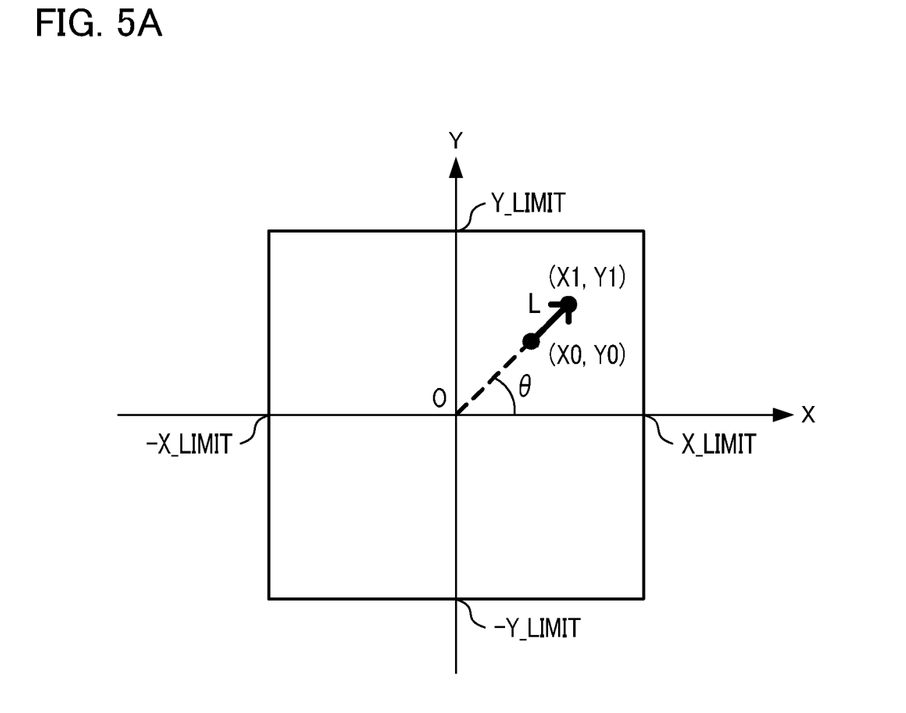
FIG. 5A is a diagram illustrating the movement of the compensation optical system 121 in a framing adjustment mode.

FIG. 5A is a diagram illustrating how the position coordinate of the compensation optical system 121 is defined in the framing adjustment mode. The axis X set in a first direction is a first axis corresponding to the axis X (the direction along which the first motor 110 is driven) shown in FIG. 2A. Also, the axis Y set in a second direction orthogonal to the first axis is a second axis corresponding to the axis Y (the direction along which the second motor 117 is driven) shown in FIG. 2A. The origin O (0, 0) on the coordinate plane formed by the first axis and the second axis indicates the center (movable center) of the movable range of the compensation optical system 121. The reference symbols "X_LIMIT" and "Y_LIMIT" indicate the movable limitation of the compensation optical system 121 in the X-axis direction and the Y-axis direction, respectively. The coordinate (X0, Y0) indicates the position coordinate prior to the movement control of the compensation optical system 121 to be described below in steps S105 to S110. For example, when the arrow 302 has been selected by a user's touch operation in FIG. 3A, the coordinate of the compensation optical system 121 is moved from the coordinate (X0, Y0) to the coordinate (X1, Y1) along the direction of the arrow 302. The coordinate (X1, Y1) represents the position of the compensation optical system 121 after being moved. In the present embodiment, the compensation optical system 121 is moved by the distance L by a one-time operation for the direction instructing operation unit 103. It is to be understood that the direction to be instructed by the direction instructing operation unit 103 is represented by the angle θ formed between the axis X serving as the reference axis and the vector of the instructed direction. At this time, the position coordinate (X1, Y1) after being moved for framing adjustment is equal to (X0+L×cos θ, Y0+L×sin θ). Note that the adjusting operation is intended as an example and the present invention is not limited thereto.

Referring back to FIG. 4, the process advances to step S104 after step S103. Then, the flag "MOVE_FLAG" indicating that the compensation optical system 121 is being driven for framing adjustment is set, and the process is ended. When the next processing of the flowchart shown in FIG. 4 is executed after the flag "MOVE_FLAG" is set in step S104, it has been determined in step S100 that the flag "MOVE_FLAG" is set, and the process advances to step S105. In step S105, the variable "Move_Count" is counted up, and one is added to the value of the variable "Move_Count". Then, the process advances to step S106, and calculation processing for the target position (X2, Y2) to which the compensation optical system 121 is driven is executed based on the following calculation formula.
[Formula 1]

$$X2 = X0 + L \times \cos\theta \times \text{Move\_Count}/\text{COUNT\_END} \quad \text{(Formula 1)}$$

$$Y2 = Y0 + L \times \sin\theta \times \text{Move\_Count}/\text{COUNT\_END} \quad \text{(Formula 2)}$$

Note that the variable "COUNT_END" (>0) represents the upper limit of the variable "Move_Count".

The calculation using Formulae 1 and 2 is made to control the excessive movement of the compensation optical system 121 from the position coordinate (X0, Y0) before the movement to a new coordinate (X1, Y1). When Move_Count is equal to 0, (X2, Y2) is equal to (X0, Y0), which indicates the coordinate prior to framing adjustment. When Move_Count is equal to COUNT_END, (X2, Y2) is equal to (X0+L×cos θ, Y0+L×sin θ), which matches the coordinate (X1, Y1) after framing adjustment. When the condition of "0<Move_Count<COUNT_END" is satisfied, X2 changes by (L×cos θ/COUNT_END) and Y2 changes by (L×sin θ/COUNT_END) per period during which processing in steps S105 and S106 is performed. In other words, when the compensation optical system 121 moves from the coordinate (X0, Y0) to the coordinate (X1, Y1) during framing adjustment, the first motor 110 and the second motor 117 are driven at constant speed. Under the driving control of the first motor 110 and the second motor 117, the drive start time and the drive end time of the first motor 110 and the second motor 117 coincide with each other.

After step S106, the process advances to step S107. In step S107, it is determined whether or not the magnitude (absolute value) of the coordinate component of the target position (X2, Y2), to which the compensation optical system 121 is driven, calculated in step S106 exceeds the limit range. When the relationship of |X2|>X_LIMIT or |Y2|>Y_LIMIT is satisfied, that is, when it has been determined that the drive target position (X2, Y2) falls outside the movable range, the process advances to step S111. When it has been determined that the drive target position (X2, Y2) falls within the movable range, the process advances to step S108.

In step s108, the variable "Move_Count" is compared with the variable "COUNT_END". When the value of the variable "Move_Count" does not match the variable "COUNT_END", the position of the compensation optical system 121 has not yet reached the coordinate (X1, Y1) after framing adjustment as shown in FIG. 5A. Thus, the process advances to step S109, and the framing adjustment operation continues in the next processing steps. On the other hand, variable when the value of "Move_Count" matches the variable "COUNT_END", the position of the compensation optical system 121 has reached the coordinate (X1, Y1) after framing adjustment as shown in FIG. 5A, and thus, the process advances to step S112.

In step S109, processing for storing the current drive target position (X2, Y2) in the variable (X_backup, Y_backup) is performed. In step S110, processing for setting X2 in the subtractor 106 and Y2 in the subtractor 113 is performed. In this manner, the driving control of the first motor 110 and the second motor 117 is made such that the position coordinate of the compensation optical system 121 becomes (X2, Y2). After step S110, the process shown in FIG. 4 is ended.

Figure 5B:
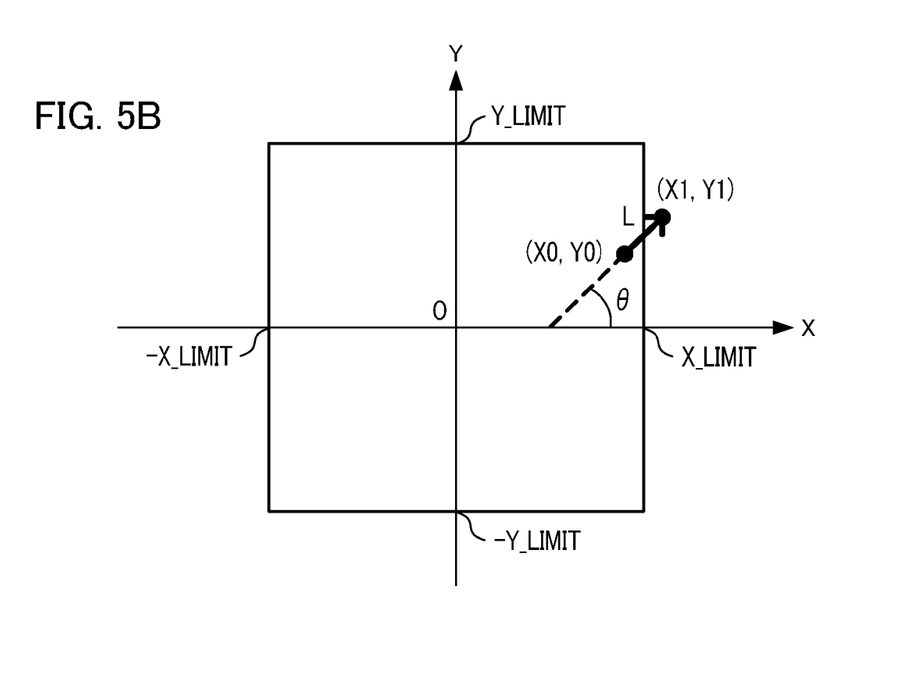
FIG. 5B is a diagram illustrating the movement of the compensation optical system 121 in a framing adjustment mode.

When the process advances from step S107 to step S111, processing for substituting the value of (X_backup, Y_backup) temporarily stored in a memory in step S103 or step S109 into the drive target position (X2, Y2) is performed. In other words, this is because the compensation optical system 121 is held at the current position so as not to move outside the movable range. As shown in FIG. 5B, when the coordinate (X1, Y1) after framing adjustment falls outside the movable range because the position (X0, Y0) of the compensation optical system 121 before framing adjustment is close to the movable limitation, the position of the compensation optical system 121 needs to be remained within the movable range. The process in steps S107 and S111 functions as a limiter therefor.

After the process in step S111 or when it has been determined in step S108 that Move_Count is equal to COUNT_END (YES in step S108), the process advances to step S112, and the coordinate of the initial position (X0, Y0) is updated. The process in steps S112 and S113 is preparation processing for terminating the framing adjustment operation so as to perform framing adjustment again. In step S112, the value of the position coordinate (X2, Y2) of the compensation optical system 121 upon the end of framing adjustment is substituted into (X0, Y0) for the next process in step S103. In step S113, reset processing for MOVE_FLAG is performed. After the process advances to step S110, the process shown in FIG. 4 is ended.

Thus, according to the first embodiment, the following effects may be obtained.

The compensation optical system 121 which is being driven during framing adjustment is driven in the X-axis direction and the Y-axis direction at constant speed. The ratio of the speed of the second motor 117 to the speed of the first motor 110, that is, the relationship of "(L×sin θ/COUNT_END)÷(L×cos θ/COUNT_END)=tan θ", is controlled at constant level. Then, the drive start time and the drive end time of the first motor 110 and the second motor 117 in the X-axis direction and the Y-axis direction coincide with each other. Thus, the movement of the compensation optical system 121, that is, the movement of a captured image, during framing adjustment does not exhibit nonlinear movement but exhibits linear movement because its moving direction does not change midway. Thus, even when the direction along which framing adjustment has been instructed does not match the direction along which each of two motors is driven, the photographic screen range moves along the instructed direction, and thus, an unnatural screen motion does not occur. When the position of the compensation optical system 121 which is being driven during framing adjustment reaches its movable limitation in either one of the X-axis direction or the Y-axis direction, the driving of the motor in the X-axis direction and the Y-axis direction is stopped. This ensures the linear movement of the compensation optical system 121, that is, the linear movement of a captured image. Since the direction of moving of the photographic screen range does not change in the middle of framing adjustment, a natural screen motion may be realized.

While, in the present embodiment, a description has been given taking an example in which a touch panel is used for the direction instructing operation unit 103 shown in FIG. 3A, the same effects as those of the embodiment may be obtained in the following variant embodiment.

Figure 2B:
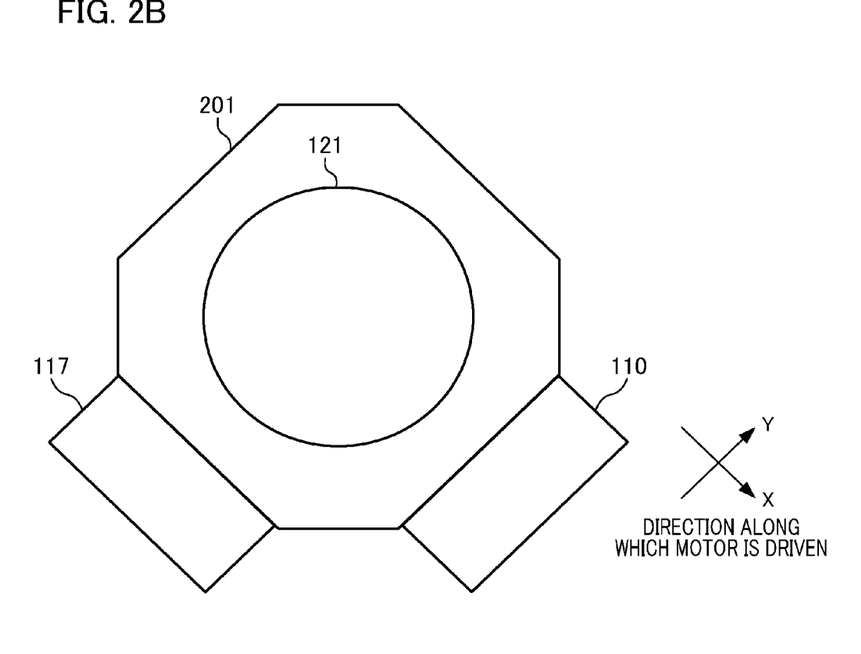
FIG. 2B is a diagram illustrating a variant example of the compensation optical system 121 and the first motor 110 and the second motor 117.

FIG. 2B shows an exemplary arrangement of the compensation optical system 121 and the first motor 110 and the second motor 117. The compensation optical system 121 indicated by a circular shape is held by a frame 201 indicated by an octagonal shape on the outside thereof. It should be noted that the movable range of the compensation optical system 121 is not necessarily a octagonal shape but may be a square or circular shape. The first motor 110 and the second motor 117 are attached at the lateral surfaces of the frame 201. The motor 110 drives the compensation optical system 121 in the X-axis direction and the second motor 117 drives the compensation optical system 121 in the Y-axis direction. The X-Y plane shown in FIG. 2B is a plane perpendicular to the optical axis of the imaging optical system 120. In the example shown in FIG. 2A, the first motor 110 is disposed on the right side of the frame 200 and the second motor 117 is disposed on the lower side of the frame 200, and thus, the center of gravity of the entire is deviated to the right side. On the other hand, in the example shown in FIG. 2B, the first motor 110 and the second motor 117 are disposed symmetrically and bilaterally with respect to the frame 201, there is no deviation in the center of gravity. Thus, the compensation optical system 121 shown in FIG. 2B exhibits excellent controllability.

Figure 3B:
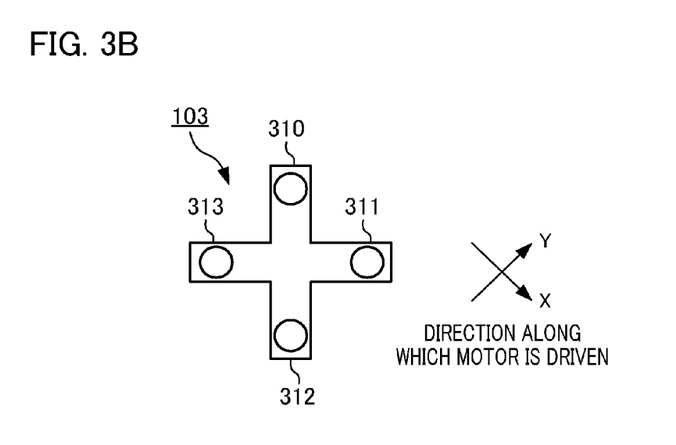
FIG. 3B is a diagram illustrating a variant example of the direction instructing operation unit 103.

FIG. 3B shows another example of the direction instructing operation unit 103 constituted by a cross key. In the framing adjustment mode, a user instructs an apparatus to perform framing adjustment in directions indicated by the operation units 310 to 313 of the cross key. The direction to be instructed by the cross key is different from the direction along which the first motor 110 is driven (the X-axis direction) and the direction along which the second motor 117 is driven (the Y-axis direction). In the present embodiment, the operation units 310 and 312 correspond to the upper and lower directions shown in FIG. 2B, respectively, and the operation units 313 and 311 correspond to the left and right directions shown in FIG. 2B, respectively. The X-axis direction is a direction diagonally downward to the right and the Y-axis direction is a direction diagonally upward to the right. As described above, even when the direction instructing operation unit 103 is a cross key, the operation direction does not necessarily coincide with the direction along which two motors for driving the compensation optical system 121 are driven. In other words, the direction along which framing adjustment has been instructed does not coincide with both the first drive direction and the second drive direction along which the motors are driven. Also in this case, a natural screen motion can be realized by performing processing described with reference to FIG. 4 without changing the direction of moving of the photographic screen range in the middle of framing adjustment by a user's operation.

(Second Embodiment)

Next, a description will be given of a second embodiment of the present invention. In the second embodiment, a description will be given of an operation performed when a user operates the zoom operation unit 129 in the framing adjustment mode.

An effective image circle diameter formed on the imaging plane of the image sensor 122 by the imaging optical system 120 typically changes depending on the zoom magnification. The movable range of the compensation optical system 121 is determined by the size of the effective image circle diameter. The compensation optical system 121 can be moved over an extensive range with an increase in the size of the effective image circle diameter.

Figure 6:
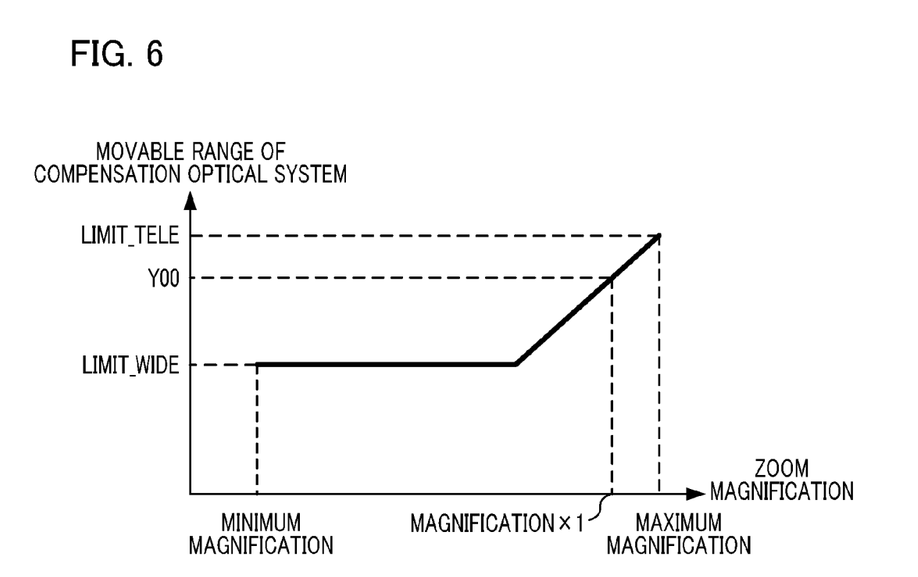
FIG. 6 is a graph illustrating an example of the relationship between the zoom magnification and the movable range of the compensation optical system 121.

FIG. 6 is a graph illustrating an example of the relationship between the zoom magnification indicating the zoom magnification of the imaging apparatus 100 and the movable range of the compensation optical system 121. The reference symbol "Y00" shown in a vertical axis represents the size of the movable range when the zoom magnification is a magnification of 1. Also, the variable "LIMIT_TELE" represents the size of the movable range at the telescopic edge at which the zoom magnification is maximized and the variable "LIMIT_WIDE" represents the size of the movable range at the wide angle edge.

Figure 7A:
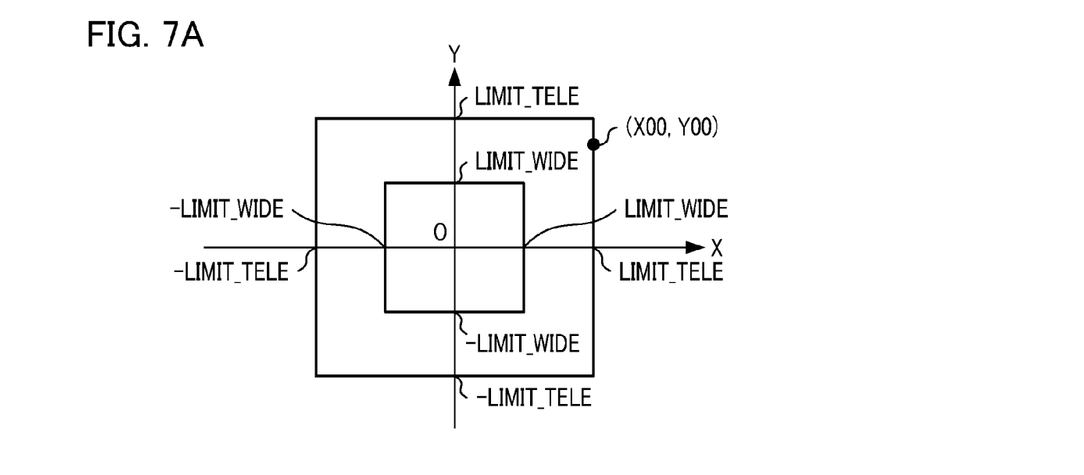
FIG. 7A is a diagram illustrating the movement of the compensation optical system 121 during zoom operation in order to explain a second embodiment of the present invention in conjunction with FIG. 8.

In the example shown in FIG. 6, the size of the movable range of the compensation optical system 121 becomes a small value as the compensation optical system 121 moves toward the wide angle side (see minimum LIMIT_WIDE), and becomes a large value as the compensation optical system 121 moves toward the telescopic end side (see maximum LIMIT_TELE). Based on the assumption that the configuration of the compensation optical system 121 is the same as that shown in FIG. 2A, the direction along which the first motor 110 is driven is the X-axis direction, and the direction along which the second motor 117 is driven is the Y-axis direction, the movable range of the compensation optical system 121 on the coordinate plane is shown in FIG. 7A. When the zoom magnification is changed to the wide angle side in a state where the zoom magnification is the maximum magnification and the compensation optical system 121 is placed at the position of the coordinate (X00, Y00) shown in FIG. 7A, the following circumstances may occur.

When the zoom magnification is changed to the wide angle side in accordance with the user operation using the zoom operation unit 129, the movable range of the compensation optical system 121 becomes small as shown in the graph in FIG. 6. Hence, it is necessary to move the position of the compensation optical system 121 from the initial position (X00, Y00) within the movable range as the zoom magnification becomes small. When the first motor 110 for driving in the X-axis direction and the second motor 117 for driving in the Y-axis direction are independently controlled, the movement of the compensation optical system 121 will be described as follows. When the zoom magnification changes from the maximum magnification to the wide angle side, the movable range narrows until the compensation optical system 121 moves to the zoom position corresponding to a magnification of 1 shown in FIG. 6. In association with this, the initial position (X00, Y00) of the compensation optical system 121 falls outside the movable range of the compensation optical system 121 moves in the X-axis direction, whereas the initial position (X00, Y00) of the compensation optical system 121 falls within the movable range if the compensation optical system 121 moves in the Y-axis direction. Thus, in order to control the position of the compensation optical system 121 to fall within the movable range, only the first motor 110 for driving in the X-axis direction needs to be driven. At this time, the position of the compensation optical system 121 moves to the coordinate (X01, Y01) shown in FIG. 7B when the compensation optical system 121 is initially at the zoom position corresponding to a magnification of 1. Since the second motor 117 is not driven in the Y-axis direction, Y01 is equal to Y00. In the case where the movable range of the compensation optical system 121 is square, the position coordinate (X01, Y01) shown in FIG. 7B falls outside the movable range in the X- and Y-axes when the zoom magnification changes from the magnification of 1 shown in FIG. 6 to the wide angle side. Thus, in order to control the position of the compensation optical system 121 to constantly fall within the movable range, both the first motor 110 for driving in the X-axis direction and the second motor 117 for driving in the Y-axis direction need to be driven. The position of the compensation optical system 121 finally moves to the coordinate (X02, Y02) shown in FIG. 7B at the wide angle edge.

Figure 7B:
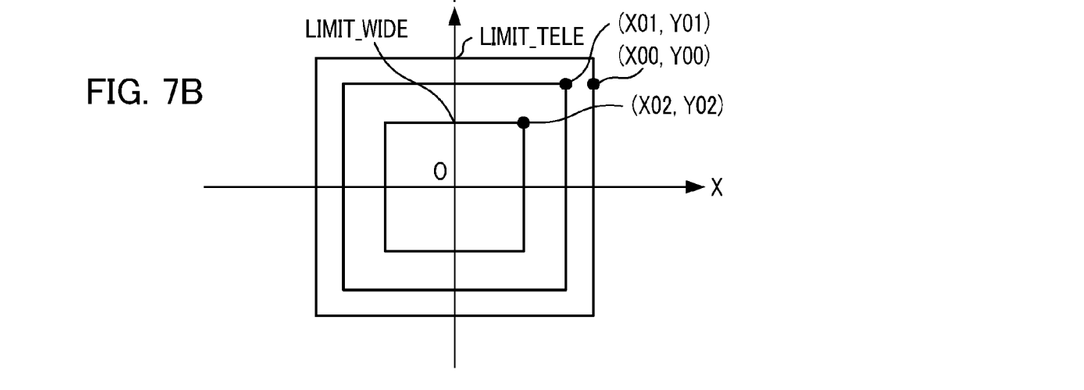
FIG. 7B is a diagram illustrating the movement of the compensation optical system 121 during zoom operation in order to explain a second embodiment of the present invention in conjunction with FIG. 8.

When the first motor 110 for driving in the X-axis direction and the second motor 117 for driving in the Y-axis direction are independently controlled, the position of the compensation optical system 121 moves from the coordinate (X00, Y00) through (X01, Y01) to (X02, Y02) as shown in FIG. 7B in the form of a broken line during zoom operation. Under such circumstances, the moving direction of the compensation optical system 121, that is, the movement of a captured image is changed unnaturally during zoom operation, resulting in discomfort to a user.

Figure 8:
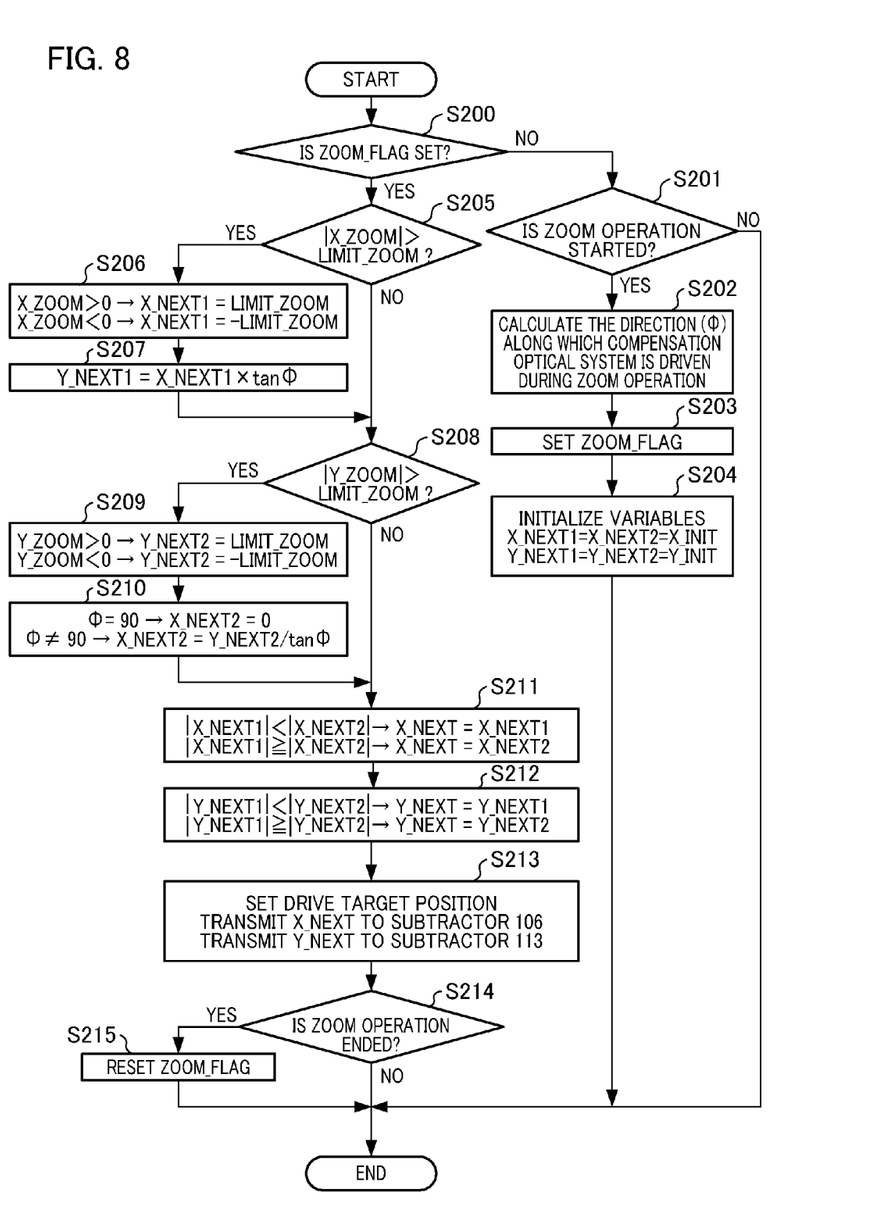
FIG. 8 is a flowchart illustrating processing performed by the driving amount calculation unit 105.

In order to avoid such circumstances, FIG. 8 shows a flowchart illustrating the flow of processing performed by the driving amount calculation unit 105. The process shown in FIG. 8 is repeatedly executed at a predetermined time interval at the framing adjustment mode.

In step S200, it is determined whether or not the flag (designated as "ZOOM_FLAG") indicating that the compensation optical system 121 is in zoom operation is set. When ZOOM_FLAG is not set, the process advances to step S201. When ZOOM_FLAG is set, the process advances to step S205.

Figure 7C:
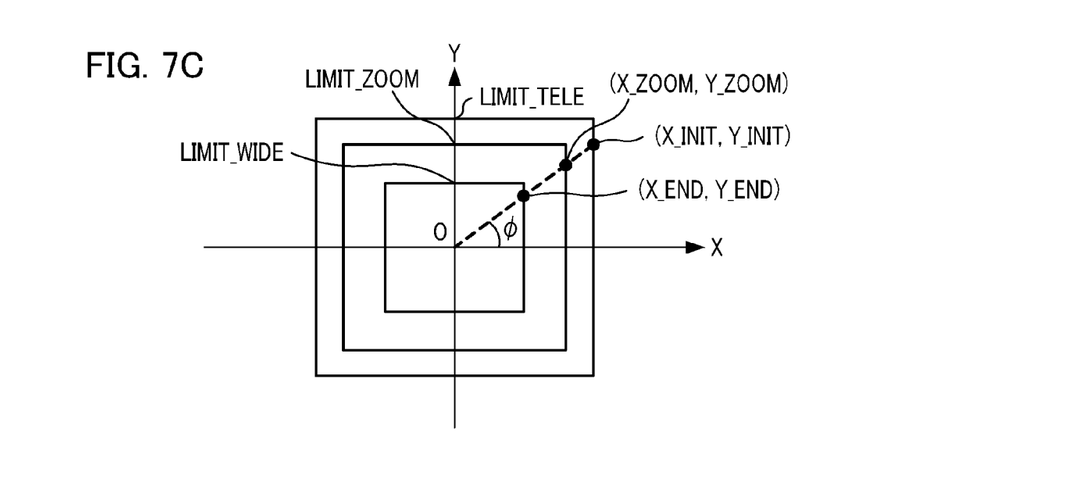
FIG. 7C is a diagram illustrating the movement of the compensation optical system 121 during zoom operation in order to explain a second embodiment of the present invention in conjunction with FIG. 8.

In step S201, the system control unit 104 determines whether or not a user's operation instruction is given to the zoom operation unit 129, and transmits information indicating whether or not zoom operation has started to the driving amount calculation unit 105. When it has been determined in step S201 that a user's operation instruction is not given to the zoom operation unit 129, the process is ended. When it has been determined in step S201 that a user's operation instruction is given to the zoom operation unit 129, the process advances to step S202, and the direction along which the compensation optical system 121 is driven is calculated. For example, when the movable range of the compensation optical system 121 changes during zoom operation, the drive direction when the position of the compensation optical system 121 moves within the movable range is calculated. A description will be given of the calculation method with reference to FIG. 6 and FIG. 7C. In the present embodiment, a description will be given based on the assumption that the zoom magnification changes from the value of the telescopic edge to the value of the wide angle side in accordance with the graph shown in FIG. 6. The axis X, the axis Y, the movable limitation, LIMIT_TELE, and LIMIT_WIDE are defined in the same manner as those in FIGS. 7A and 7B, and thus, an explanation thereof will be omitted. The zoom magnification obtained when the process in step S202 is performed is intended to be the maximum magnification shown in FIG. 6, and the position coordinate of the compensation optical system 121 is intended to be (X_INIT, Y_INIT). Given that the direction along which the compensation optical system 121 is driven is $\Phi$ [unit: deg], the calculation formula is as follows:

$$\Phi = \arctan(Y\_INIT/X\_INIT) \text{ when } X\_INIT > 0$$

$$\Phi = \arctan(Y\_INIT/X\_INIT) + 180 \text{ when } X\_INIT < 0$$

$$\Phi = 90 \text{ when } X\_INIT = 0 \qquad \text{[Formula 2]}$$

The arc tan( ) in the above formula represents an arc tan function. As shown in FIG. 7C, the value of $\Phi$ corresponds to an angle between a segment for connecting the coordinate (X_INIT, Y_INIT) of the compensation optical system 121 to the movable center O (0, 0) of the compensation optical system 121 and the axis X.

The process advances to step S203 after step S202. Then, the flag "ZOOM_FLAG" indicating that the compensation optical system 121 is in zoom operation is set, and the process advances to step S204. In step S204, processing for substituting the current X-axis coordinate of the compensation optical system 121 into the variables X_NEXT1 and X_NEXT2 to be described below is performed. Likewise, processing for substituting the current Y-axis coordinate of the compensation optical system 121 into the variables Y_NEXT1 and Y_NEXT2 is performed, and the process in FIG. 8 is ended. When the next processing steps of the flowchart shown in FIG. 8 is executed after the flag "ZOOM_FLAG" is set in step S203, the process advances from step S200 to step S205.

In FIG. 7C, the current position coordinate of the compensation optical system 121 is (X_ZOOM, Y_ZOOM), and the movable limitation indicating the boundary of the movable range at the zoom position is LIMIT_ZOOM (>0). For ease of explanation, the movable range on the coordinate plane is square. In steps S205 and S208, it is determined whether or not the current position coordinate exceeds the movable limitation LIMIT_ZOOM. When it has been determined in step S205 that the absolute value of X_ZOOM is greater than LIMIT_ZOOM, that is, when it has been determined in step S205 that the position of the compensation optical system 121 exceeds the movable range in the X-axis direction, the process advances to step S206. When it has been determined in step S205 that the absolute value of X_ZOOM is equal to or less than LIMIT_ZOOM, the process advances to step S208.

In step S206, the coordinate in the X-axis direction such that the position of the compensation optical system 121 falls within the movable range in the X-axis direction is calculated, and is substituted into the variable X_NEXT1. More specifically, if X_ZOOM>0, X_NEXT1 is equal to LIMIT_ZOOM, whereas if X_ZOOM<0, X_NEXT1 is equal to −LIMIT_ZOOM. In step S207, when the position of the compensation optical system 121 in the X-axis direction moves to the position calculated in step S206, the coordinate in the Y-axis direction is calculated in order to move the position of the compensation optical system 121 in the direction of $\Phi$ calculated in step S202, and the calculated coordinate is substituted into the variable Y_NEXT1. The calculation formula is as follows:

$$Y\_NEXT1 = X\_NEXT1 \times \tan \Phi \qquad \text{[Formula 3]}$$

The process advances to step S208 after step S207, and the absolute value of Y_ZOOM is compared with LIMIT_ZOOM. When it has been determined that the absolute value of Y_ZOOM is greater than LIMIT_ZOOM, that is, when it has been determined that the position of the compensation optical system 121 exceeds the movable range in the Y-axis direction, the process advances to step S209. When it has been determined that the absolute value of Y_ZOOM is equal to or less than LIMIT_ZOOM, the process advances to step S211.

In step S209, the coordinate in the Y-axis direction such that the position of the compensation optical system 121 falls within the movable range in the Y-axis direction is calculated, and the calculated coordinate is substituted into the variable Y_NEXT2. More specifically, if Y_ZOOM>0, Y_NEXT2 is equal to LIMIT_ZOOM, whereas if Y_ZOOM<0, Y_NEXT2 is equal to −LIMIT_ZOOM. In step S210, when the position of the compensation optical system 121 in the Y-axis direction moves to the position calculated in step S209, the coordinate in the X-axis direction is calculated in order to move the position of the compensation optical system 121 in the direction of Φ calculated in step S202, and the calculated coordinate is substituted into the variable X_NEXT2. The calculation formula is as follows:

When $\Phi=90$, $X\_NEXT2=0$

When $\Phi \neq 90$, $X\_NEXT2 = Y\_NEXT2 / \tan \Phi$  [Formula 4]

After step S210, the process advances to step S211 and then step S212. The processes in steps S211 and S212 are processing for calculating the destination coordinate (X_NEXT, Y_NEXT) for moving the position of the compensation optical system 121 to be within the movable range. In step S211, the absolute value of X_NEXT1 is compared with the absolute value of X_NEXT2, and the smaller one is substituted into X_NEXT. In other words, if |X_NEXT1|<|X_NEXT2|, X_NEXT is equal to X_NEXT1, whereas if |X_NEXT1|≥|X_NEXT2|, X_NEXT is equal to X_NEXT2. In step S212, the absolute value of Y_NEXT1 is compared with the absolute value of Y_NEXT2, and the smaller one is substituted into Y_NEXT. In other words, if |Y_NEXT1|<|Y_NEXT2|, Y_NEXT is equal to Y_NEXT1, whereas if |Y_NEXT1|≥|Y_NEXT2|, Y_NEXT is equal to Y_NEXT2.

In step S213, the value of X_NEXT is transmitted to the subtractor 106, and the value of Y_NEXT is transmitted to the subtractor 113, and thus, the drive target position of the compensation optical system 121 is set to (X_NEXT, Y_NEXT). Through the processes in steps S211 to S213, even when the movable range of the compensation optical system 121 becomes small during zoom operation, the position of the compensation optical system 121 moves on the segment (see a broken line) at an angle of Φ degrees connecting the coordinate (X_INIT, Y_INIT) and the origin O shown in FIG. 7C. The coordinate (X_END, Y_END) indicates the final position of the compensation optical system 121, and is placed on the segment at an angle of Φ degrees.

When it has been determined in step S205 that the absolute value of X_ZOOM is equal to or less than LIMIT_ZOOM and it has been determined in step S208 that the absolute value of Y_ZOOM is equal to or less than LIMIT_ZOOM, the variables X_NEXT1, X_NEXT2, Y_NEXT1, and Y_NEXT2 do not change. The values of these variables remain the same as those set in step S204. Thus, in the processes in steps S211 and S212, (X_NEXT, Y_NEXT) is equal to (X_INIT, Y_INIT), the position of the compensation optical system 121 do not change.

The process advances to step S214 after step S213, it is determined whether or not the user operation for the zoom operation unit 129 is ended. When it has been determined that the user operation for the zoom operation unit 129 is not ended, the process is ended. When it has been determined in step S214 that the user operation for the zoom operation unit 129 is ended, the process advances to step S215. In step S215, the process shown in FIG. 8 is ended after the flag "ZOOM_FLAG" indicating that the compensation optical system 121 is in zoom operation is reset.

According to the second embodiment, when the position of the compensation optical system 121 may undesirably fall outside the movable range in association with zoom operation in the framing adjustment mode, coordinate calculation is performed such that the position moves toward the movable center of the compensation optical system 121. The direction of moving of the compensation optical system 121, that is, the direction of moving of the photographic screen range does not change in the middle of zoom operation, but is regulated to a fixed direction as specified. Hence, a captured image moves linearly, and thus, a natural screen motion may be realized.

While, in the aforementioned embodiments, the compensation lens serving as the compensation optical system 121 moves in a direction orthogonal to the optical axis direction, the present invention is also applicable to the case where the image sensor 122 moves in a direction orthogonal to the optical axis direction of the imaging optical system. The present invention is further applicable to an image blur compensation optical system that compensates image blur by tilting the optical axis itself.

While the embodiments of the present invention have been described with reference to exemplary embodiments, it is to be understood that the invention is not limited to the disclosed exemplary embodiments. The scope of the following claims is to be accorded with the broadest interpretation so as to encompass all such modifications and equivalent structures and functions.

This application claims the benefit of Japanese Patent Application No. 2011-083032 filed Apr. 4, 2011 which is hereby incorporated by reference herein in its entirety.

What is claimed is:

1. An imaging apparatus that is capable of changing a photographic screen range using a compensation member which compensates image blur caused by camera shake, the imaging apparatus comprising:
   a direction instructing operation unit configured to instruct a direction of a change in the photographic screen range;
   a first drive unit configured to drive the compensation member in a first direction not parallel to the optical axis of a photographing optical system;
   a second drive unit configured to drive the compensation member in a second direction not parallel to the optical axis and orthogonal to the direction of the first direction; and
   a control unit configured to control the first drive unit and the second drive unit in accordance with an operation instruction given by the direction instructing operation unit,
   wherein, when the direction instructed by the direction instructing operation unit does not match any of the first direction and the second direction, the control unit matches a drive start time and a drive end time of both the first drive unit and the second drive unit, and controls the ratio of the speed of the second drive unit to the speed of the first drive unit at a constant level.

2. The imaging apparatus according to claim 1, wherein, when the compensation member has reached the movable limitation of the compensation member in the first direction or the second direction during driving of the first drive unit and the second drive unit, the control unit stops driving of the first drive unit and the second drive unit.

3. The imaging apparatus according to claim 1, further comprising:

a zoom operation unit configured to instruct a change in zoom magnification of the photographing optical system; and a zoom control unit configured to control a change in the zoom magnification in accordance with an operation instruction given by the zoom operation unit, wherein the movable range of the compensation member changes with a change in the zoom magnification by the zoom control unit, and wherein the control unit controls the position of the compensation member to move in a direction toward a movable center such that the position of the compensation member falls within the movable range to thereby control the position of the compensation member.

4. The imaging apparatus according to claim 3, wherein the movable center is the origin of the coordinate plane formed by a first axis corresponding to the first direction and a second axis corresponding to the second direction, and wherein the control unit calculates the drive direction of the compensation member based on an angle between a segment for connecting the position of the compensation member to the movable center on the coordinate plane and the first axis or the second axis.

5. The imaging apparatus according to claim 4, wherein the control unit controls the first drive unit and the second drive unit with respect to the movable range of the compensation member, which changes with a change in the zoom magnification, in accordance with the drive target position of the compensation member, which has been calculated using a coordinate value indicated by the movable limitation of the compensation member and the angle.

6. A control method to be executed by an imaging apparatus that is capable of changing a photographic screen range using a compensation member for compensating image blur, the method comprising:

receiving an instruction about a direction of a change in the photographic screen range from a direction instructing operation unit; and driving the compensation member in a first direction not parallel to the optical axis of a photographing optical system by a first drive unit and driving the compensation member in a second direction not parallel to the optical axis and orthogonal to the direction of the first direction by a second drive unit in accordance with an instruction given by the direction instructing operation unit, ewherein, when the direction instructed by the direction instructing operation unit matches neither the first direction nor the second direction, the control unit matches a drive start time and a drive end time of both the first drive unit and the second drive unit, and controls the ratio of the speed of the second drive unit to the speed of the first drive unit at a constant level.

* * * * *